US008635017B2

(12) United States Patent
Geelen et al.

(10) Patent No.: US 8,635,017 B2
(45) Date of Patent: Jan. 21, 2014

(54) METHOD OF GENERATING IMPROVED MAP DATA FOR USE IN NAVIGATION DEVICES

(75) Inventors: Pieter Geelen, Amsterdam (NL); Rory Jones, Amsterdam (NL)

(73) Assignee: TomTom International B.V., Amsterdam (NL)

( * ) Notice: Subject to any disclaimer, the term of this patent is extended or adjusted under 35 U.S.C. 154(b) by 378 days.

(21) Appl. No.: 11/889,729

(22) Filed: Aug. 15, 2007

(65) Prior Publication Data

US 2008/0065325 A1 Mar. 13, 2008

Related U.S. Application Data

(60) Provisional application No. 60/901,309, filed on Feb. 15, 2007.

(30) Foreign Application Priority Data

Aug. 15, 2006 (GB) .................................. 0616211.9

(51) Int. Cl.
*G01C 21/00* (2006.01)
*G08G 1/123* (2006.01)

(52) U.S. Cl.
USPC ..................................... 701/411; 340/995.25

(58) Field of Classification Search
USPC ......... 701/200, 201, 206–214, 300, 400–541; 340/988, 989, 990, 995.1, 995.12, 340/995.14, 995.18, 995.19, 995.24, 340/995.25, 995.27
See application file for complete search history.

(56) References Cited

U.S. PATENT DOCUMENTS

| | | | |
|---|---|---|---|
| 5,629,854 A | 5/1997 | Schulte | |
| 5,951,620 A | 9/1999 | Ahrens et al. | |
| 6,075,467 A | 6/2000 | Ninagawa | |
| 6,138,072 A * | 10/2000 | Nagai | ........................... 701/454 |
| 6,253,151 B1 | 6/2001 | Ohler et al. | |
| 6,314,367 B1 | 11/2001 | Ohler et al. | |
| 6,317,685 B1 | 11/2001 | Kozak et al. | |
| 6,453,233 B1 | 9/2002 | Kato | |
| 6,546,334 B1 | 4/2003 | Fukuchi et al. | |

(Continued)

FOREIGN PATENT DOCUMENTS

| | | |
|---|---|---|
| CN | 1670482 B | 9/2005 |
| CN | 1674003 A | 9/2005 |

(Continued)

OTHER PUBLICATIONS

International Search Report issued Dec. 11, 2007 for International Application No. PCT/EP2007/007306.

(Continued)

*Primary Examiner* — Muhammad Shafi

(57) ABSTRACT

An end-user can input a correction to a map error, directly on the device. The device is then able to use the correction without external processing of the correction. Hence, it is no longer necessary for an end-user to simply report errors to the map vendor over a web link, then wait for that map vendor to verify the error, update its maps and finally supply the end-user with updates—a cycle that can take months and sometimes years to complete. Instead, the navigation device can use the correction immediately. End-users can also share corrections with other end-users and also with a shared remote server that aggregates, validates and distributes corrections.

18 Claims, 10 Drawing Sheets

(56) References Cited

U.S. PATENT DOCUMENTS

| | | | |
|---|---|---|---|
| 6,853,905 B2 | 2/2005 | Barton | |
| 7,480,565 B2 | 1/2009 | Ikeuchi et al. | |
| 7,496,447 B2 | 2/2009 | Tanaka | |
| 7,496,484 B2 * | 2/2009 | Agrawala et al. | 703/2 |
| 7,590,538 B2 | 9/2009 | St. John | |
| 7,890,255 B2 | 2/2011 | Ikeuchi et al. | |
| 2001/0037203 A1 | 11/2001 | Satoh | |
| 2003/0023375 A1 | 1/2003 | Yoshida | |
| 2003/0023378 A1 | 1/2003 | Ichimura | |
| 2004/0172418 A1 | 9/2004 | Dorum et al. | |
| 2004/0186661 A1 | 9/2004 | Barton | |
| 2004/0204833 A1 | 10/2004 | Yokota | |
| 2005/0010963 A1 | 1/2005 | Zeng et al. | |
| 2005/0049784 A1 | 3/2005 | Ikeuchi et al. | |
| 2005/0102098 A1 * | 5/2005 | Montealegre et al. | 701/209 |
| 2005/0216511 A1 | 9/2005 | Umezu et al. | |
| 2005/0267676 A1 | 12/2005 | Nezu et al. | |
| 2006/0047676 A1 | 3/2006 | Ouchi | |
| 2006/0074547 A1 * | 4/2006 | Kaufman et al. | 701/200 |
| 2006/0095202 A1 * | 5/2006 | Atarashi et al. | 701/208 |
| 2006/0173613 A1 | 8/2006 | Iwahori | |
| 2006/0173614 A1 | 8/2006 | Nomura | |
| 2006/0276961 A1 | 12/2006 | Kwon | |
| 2007/0032949 A1 | 2/2007 | Arai et al. | |
| 2007/0078570 A1 * | 4/2007 | Dai et al. | 701/1 |
| 2007/0124064 A1 * | 5/2007 | Fukui et al. | 701/208 |
| 2007/0150186 A1 | 6/2007 | Ingulsrud | |
| 2007/0299605 A1 | 12/2007 | Onishi et al. | |
| 2008/0040031 A1 | 2/2008 | Tu | |
| 2008/0082225 A1 | 4/2008 | Barrett | |
| 2008/0177469 A1 | 7/2008 | Geelen et al. | |
| 2010/0131186 A1 | 5/2010 | Geelen et al. | |

FOREIGN PATENT DOCUMENTS

| | | |
|---|---|---|
| DE | 19742414 A1 | 4/1999 |
| EP | 1087359 A2 | 3/2001 |
| EP | 1244086 A2 | 9/2002 |
| EP | 1300654 A1 | 4/2003 |
| EP | 1530025 A2 | 5/2005 |
| JP | 9090869 A | 4/1997 |
| JP | 9145383 A | 6/1997 |
| JP | 2000111354 A | 4/2000 |
| JP | 2000337899 A | 12/2000 |
| JP | 2001084491 A | 3/2001 |
| JP | 2002340594 A | 11/2002 |
| JP | 2003315063 A | 11/2003 |
| JP | 2004361324 A | 12/2004 |
| JP | 2005003700 A | 1/2005 |
| JP | 2005077619 A | 3/2005 |
| JP | 2005265574 A | 9/2005 |
| JP | 2005291872 A | 10/2005 |
| JP | 2005308577 A | 11/2005 |
| JP | 2005339514 A | 12/2005 |
| JP | 2006126683 A | 5/2006 |
| JP | 2006145332 A | 6/2006 |
| JP | 2006201311 A | 8/2006 |
| JP | 2006259087 A | 9/2006 |
| RU | 2272255 C1 | 3/2006 |
| TW | 490571 B | 6/2002 |
| TW | 491991 B | 6/2002 |
| TW | 200509001 A | 3/2005 |
| TW | I235309 B | 7/2005 |
| WO | 9915857 A1 | 4/1999 |
| WO | 2004112413 A1 | 12/2004 |

OTHER PUBLICATIONS

International Search Report issued Nov. 30, 2007 for International Application No. PCT/EP2007/007307.

International Search Report issued Dec. 4, 2007 for International Application No. PCT/EP2007/007308.

International Search Report issued Dec. 19, 2007 for International Application No. PCT/EP2007/007309.

International Search Report issued Nov. 27, 2007 for International Application No. PCT/EP2007/007310.

International Search Report issued Dec. 13, 2007 for International Application No. PCT/EP2007/007311.

International Search Report issued Feb. 26, 2008 for International Application No. PCT/EP2007/007305.

* cited by examiner

METHOD OF GENERATING IMPROVED MAP DATA FOR USE IN NAVIGATION DEVICES

CROSS-REFERENCES TO RELATED APPLICATIONS

This application claims the benefit of U.S. Provisional Patent Application No. 60/901,309 filed Feb. 15, 2007 and United Kingdom Patent Application No. 0616211.9 filed Aug. 15, 2006. The entire content of these applications is incorporated herein by reference.

FIELD OF THE INVENTION

This invention relates to a method of generating improved map data for use in navigation devices. Navigation devices include GPS based electronic personal navigation devices.

DESCRIPTION OF THE PRIOR ART

Map data for electronic navigation devices, such as GPS based personal navigation devices like the GO™ from TomTom International BV, comes from specialist map vendors such as Tele Atlas NV. This map data is specially designed to be used by route guidance algorithms, typically using location data from the GPS system. For example, roads can be described as lines—i.e. vectors (e.g. start point, end point, direction for a road, with an entire road being made up of many hundreds of such sections, each uniquely defined by start point/end point direction parameters). A map is then a set of such road vectors, data associated with each vector (speed limit; travel direction etc.) plus points of interest (POIs), plus road names, plus other geographic features like park boundaries, river boundaries etc, all of which are defined in terms of vectors. All map features (e.g. road vectors, POIs etc.) are typically defined in a co-ordinate system that corresponds with or relates to the GPS co-ordinate system, enabling a device's position as determined through a GPS system to be located onto the relevant road shown in a map and for an optimal route to be planned to a destination.

To construct this map database, Tele Atlas starts with basic road information from various sources, such as the Ordnance Survey for roads in England. It also has a large, dedicated team of vehicles driving on roads, plus personnel checking other maps and aerial photographs, to update and check its data. This data constitutes the core of the Tele Atlas map database. This map database is being continuously enhanced with geo-referenced data. It is then checked and published four times a year to device manufacturers like TomTom.

Despite the huge resources that go into updating and verifying these maps, the data for some geographic areas may be a year or more out of date.

In addition to the ongoing improvements described above, end-users can directly report map errors to Tele Atlas using Tele Atlas' web site. Device manufacturers like TomTom also capture and forward map error reports from their users in this way. These error reports are generally just in a free text format, so that considerable effort has to be expended in working out what the error really means and what exact location they relate to. Once verified as a real error, the appropriate correction is validated and then included in a future map release. The correction may eventually find itself in an end-user device a year or more after first being notified or, in some cases, not at all.

It is also known to store a 'trace' of a journey planned and completed using a GPS satellite navigation device (see for example the 'GPS track submission' functionality offered by ALK Technologies of Princeton, USA). This trace is a record of the complete route taken by a vehicle, using geo-coded data. The user can then send this trace data back to the device vendor, it is then used to improve the accuracy and completeness of the map database. For example, the precise position of a road or a turning may not be accurately captured on a map used by a device; the aggregated tracks for people taking that road or turning will enable a more accurate position to be determined; future map releases by the device vendor can incorporate the correction.

Reference may also be made to collaborative mapping projects, frequently called 'wikimaps'. Wikimaps do not however generate 'map data' as we define that term—i.e. map data that is suitable for route guidance algorithms to plot a route on a road system to a destination.

SUMMARY OF THE INVENTION

The invention is a method of generating improved map data for use in navigation devices, the method comprising the steps of:
a) displaying map data, suitable for route guidance algorithms, on an electronic navigation device;
b) an end-user of the device inputting a correction to a map error, directly on the device;
c) the device being able to use the correction without external processing of the correction.

Hence, it is no longer necessary for an end-user to be restricted to reporting errors to the map vendor over a web link, then waiting for that map vendor to verify the error, update its maps and supply the update—a cycle that can take months and sometimes years to complete. Instead, the navigation device can use the correction without external processing—e.g. verification by the map vendor. Use of the correction by the device can, in relative terms, be 'immediate'. The term 'immediate' should not be construed as instantaneously, but as simply meaning soon after the correction has been input. There can be intervening steps, such as the user verifying that the correction should be used, turning the device on and then off etc.

In an implementation, there is a navigation device that allows users to make modifications to the map data stored on their device. The navigation device can be a portable stand-alone GPS navigation device with route guidance capability, such as the GO series device from TomTom International BV, or any other kind of portable information device, such as a mobile telephone or PDA. But equally, it could be a device integrated into a vehicle, or a computing device such as a static desktop PC (including a laptop) running navigation software (which term includes mapping software which does not actually deliver dynamic route guidance but instead simply mapping—where the user is. Also, the navigation software could run locally on the client device or run on a server remote from the client device). The PC can then dock with a portable navigation device with a route guidance capability and transfer the corrections to the portable navigation device.

Typical features of such a navigation device are:
A user interface allowing users to create corrections to a digitally stored map;
A user interface that allows users to include or exclude map corrections from route calculations;
A user interface that allows user to view their corrected map data on the digital map
A set of correction categories that allow users to associate map corrections with one or more transportation types;

The ability to share map corrections with other users, for example via a content aggregation service. Shared maps are available for use (e.g. by a route planning algorithm or map display engine) as soon as they are downloaded.

A second aspect of the invention is an automated map correction suggestion method: in this method, a navigation device collects and analyses statistical data relating to driver behaviour and, typically when certain threshold criteria are met, suggests map corrections to the user. For example, if the user does not turn into a road that the device planned a route down, it may be because the actual road has a 'no entry' sign, but the map stored on the device is not up to date. The device can then automatically display a message such as 'Sorry, was the map incorrect?' with 'yes' and 'no' buttons displayed by the message. If the user presses 'yes', the device might then display the user interface allowing users to create corrections to the map stored on the device. The user can then correct the map by marking the road as a 'no entry' road. That correction is immediately available to the route planning algorithms running on the navigation device.

A third aspect is a map correction analysis method: in this method, a system analyses map corrections using one or more of the following:
  Analysis and aggregation of user corrections to derive the "validity" of a correction;
  Analysis of corrections supplied by a single user to derive "trustworthiness" of corrections from that user;
  Keyword analysis of all string data in order to remove "banned" words (e.g. expletives in street names);
  Analysis of corrections in order to decide whether a map correction should be applied to other maps of the same region (both maps from other suppliers and newer versions of the map from the same supplier).

BRIEF DESCRIPTION OF THE DRAWINGS

The present invention will be described with reference to the accompanying drawings, in which.

DETAILED DESCRIPTION OF THE INVENTION

The present invention will be described with reference to an implementation called Map Share™. Map Share will allow users to fix and also to share and report map errors using GO personal navigation devices from TomTom International B.V. The user enters the correction (or map fix) into the navigation device. The map fix is then applied locally in the device to supplement the map data used by the device in routing and displaying roads, POIs etc. The map fix is immediately available. The map fix can be reported to a TomTom server by the device in a number of ways: the device may have an integral communications capability (e.g. wireless cellular system that can send data to the server), may be able to send data over a short range wireless link to a mobile telephone which in turn sends the data to the server, may be able to dock with an internet connected PC that can communicate with the server, or may itself be that internet connected PC. The server can then aggregate all corrections from all users, validate corrections, and distribute the corrections to other users, and share the corrections with one or more map vendors.

When fully implemented, this feedback could replace map vendor updates as the primary mechanism for updating map data in TomTom products.

The scope of one implementation of Map Share is to provide user friendly, on-device tools allowing the user to:
  Block and un-block streets on their map
  Modify the traffic direction of streets on their map
  Add and modify street names on their map
  Modify speed limits of roads on their map
  Hence, the corrections directly affect how the routing calculation algorithms operate—i.e. they are used when calculating a route to a destination. Map Share also allows the user to:
  Add safety camera locations to the map
  Share map corrections with other users
  Download map corrections from other users
  Create map error reports for large errors.
  In addition to on-device corrections, the same correction features for all the above correction types can be made available using a desktop computer application that is capable of connecting to the device, e.g. in order to store corrections.

Figure 1A:
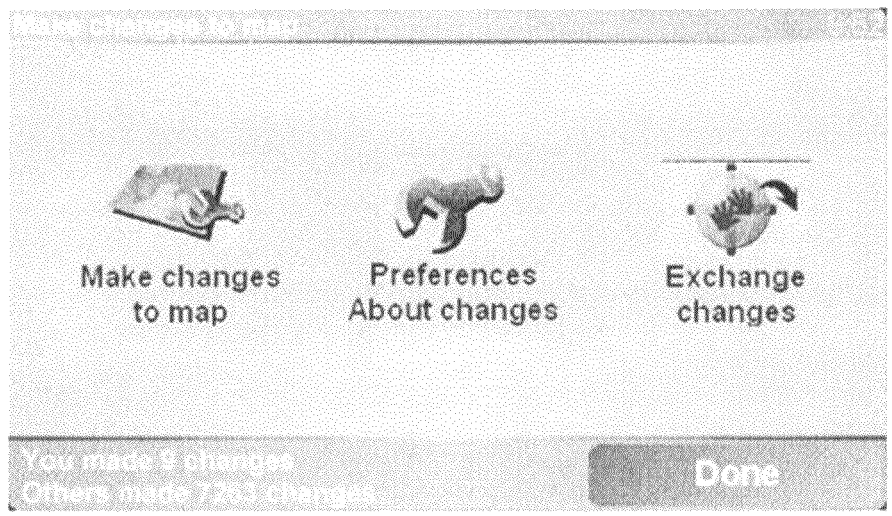
FIG. 1 is the main error reporting screen displayed by a navigation device.

In addition to on-device features, improvements are possible to the existing TomTom map error reporting tool, which is web based:
  Map error reporting will be made easier to find within the TomTom Support Website
  Map error reporting tools will be added to the TomTom Home application
  Users will receive feedback on the map errors that they have reported.
  TomTom will be able to pre-prioritise errors before sending them to its map supplier, e.g. TeleAtlas.
  As explained earlier, important features of the Map Share implementation are:
    to do map corrections, error reporting etc. on the
    to make certain corrections take immediate effect (e.g. those meeting user-defined criteria)
    to allow users to exchange corrections with others
  On a GO navigation device, this can be implemented by the device displaying a menu item 'Make changes to the map', as shown in FIG. 1A. The consequences of selecting this item are discussed below. There are 2 further menu items that will be described first.

First, the menu item 'Exchange Changes' allows the user to initiate an upload of the user's own changes, and download other people's changes to the device. Upload can be via a mobile telephone with a GPRS wireless link that links to the GO device over a Bluetooth network or via an Internet connected PC that the GO device is docked with.

Figure 1B:
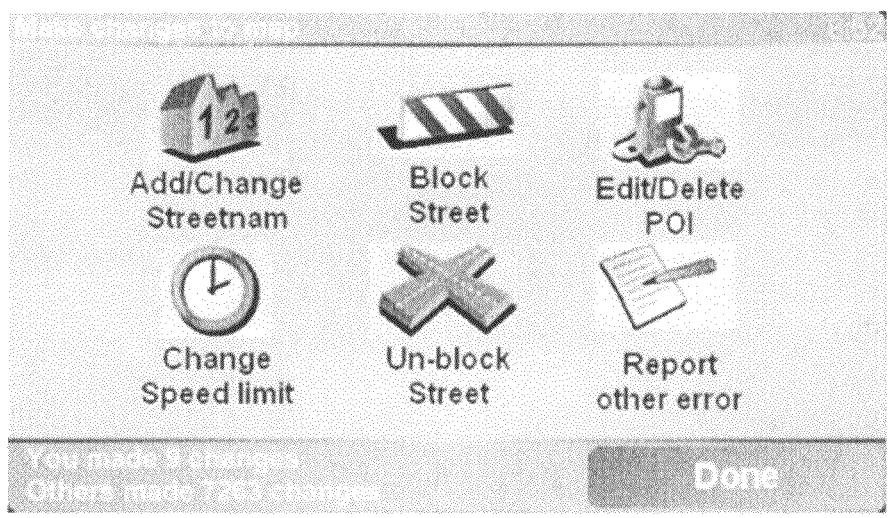

Secondly, the menu item 'Preferences About changes' determines which changes to enable. Selecting this item can cause the device to display a menu screen, with check boxes for the user to indicate applicable types of changes to enable:

Which changes should be enabled:
[x] your own changes
[x] recent changes
[ ] last year's changes/made on other maps
[x] only if reported more than once
[x] only from trusted sources
1365 of 2635 available changes enabled If the user selects the 'Make changes to map' icon by touching it, it takes the user to a submenu which offers INSTANT-EFFECT options to change the map—plus the option to REPORT an error (if it is not covered by self-action). These include, as shown in FIG. 1B:

Add/change street name: if a user selects this, then the device could, for example, display a list of names of streets currently being displayed by the map (or that would be displayed if the device were in the normal navigation mode); the user could select the street to be re-named and then enter the new name via an on-screen keyboard.

Block Street: if a user selects this, then the device could, for example, display a list of names of streets currently being displayed by the map (or that would be displayed if the device were in the normal navigation mode); the user could select the street to blocked.

Change traffic direction (not shown): if a user selects this, then the device could, for example, display a list of names of streets currently being displayed by the map (or that would be displayed if the device were in the normal navigation mode) together with the traffic direction; the user could select the street whose traffic direction is to be altered.

Change speed limit: if a user selects this, then the device could, for example, display a list of names of streets currently being displayed by the map (or that would be displayed if the device were in the normal navigation mode) together with applicable speed limits; the user could select the street whose street limit is to be altered and then select the appropriate new speed limit from a menu.

Un-block street: if a user selects this, then the device could, for example, display a list of names of blocked streets currently being displayed by the map (or that would be displayed if the device were in the normal navigation mode); the user could select the street to be unblocked.

In addition, it is possible, selecting the 'Edit/delete POI' icon to reach a deeper sub-menu with graphical options for the following:
Rename a POI
Move a POI
Add a POI to a category
Delete a POI
Re-categorize a POI In each case, the device could, for example, display a list of names of POIs currently being displayed by the map (or that would be displayed if the device were in the normal navigation mode); the user could select the relevant POI and then edit or delete that POI. These POIs are typically those supplied by the map vendor but can include POIs downloaded by the user (e.g. speed cameras).

A further menu item is to 'Report other error'. This enables complaints, missing roads etc. to be reported. Typical functions will enable the user to pick a location, select from a list of typical issues, allow user to add free text commentary etc.

Other Features
Users can create "private" fixes for their map and "shared" fixes that are also sent to TomTom for aggregation.
Each map fix is stored independently
All map fixes are highly compressible for OTA distribution
All map fixes are HIGHLY secure (such that it is not possible to manually reverse engineer the format) to ensure that competitors cannot use fixes made on TomTom devices to correct their own maps.
Fixes are stored in a map-independent form
Map fixes are preserved during map upgrades
Map fixes can be applied to maps from different vendors
Map fixes can be automatically removed if the area related to the fix has changed in a new release of the map data (as in this case we assume that the map error has been fixed by the map supplier).
Map fixes do NOT permanently modify the user's map data.
Users can choose which kinds of changes they use (e.g. "use only my changes" or "use mychanges and those from TomTom").
TomTom maintains map fix databases for each released map version Note: users with new maps can receive fixes reported on older maps, but users of old maps will NOT be able to receive fixes reported on newer maps).
TomTom creates an aggregation system so that map fixes and reports can be collected and shared with other users.
TomTom creates a "trust" system so that the validity or credibility of map fixes and reports can be assessed. Users who report good errors on a regular basis may become "trusted", and their fixes are offered to all users without the need for validation. These users may also be asked to validate fixes submitted by other users.
TomTom endorses fixes sent by users (once they have been validated).

Figure 2:
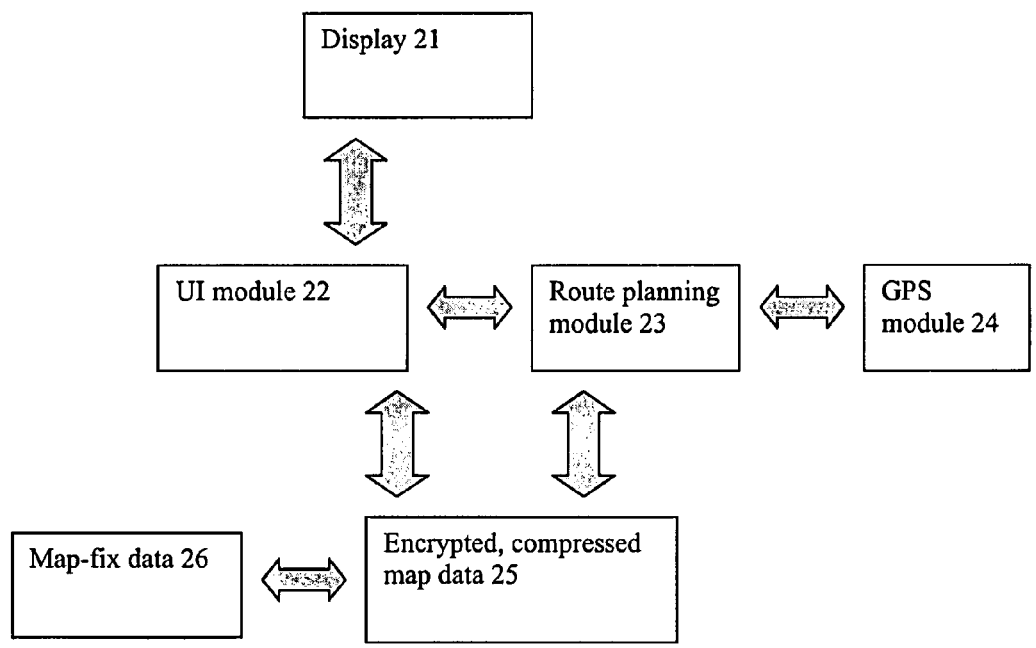
FIG. 2 is the screen shown that allows users to define the type of error they wish to capture and report.

FIG. 2 shows schematically the core software modules deployed in a navigation device implementing the invention. The display 21 is a touch screen display that the user enters a destination address into in the conventional manner. That address data input is handled by the UI module 22 and sent to the navigation/route planning module 23. Route planning module 23, taking a GPS feed from GPS module 24, plans a route using map data from the encrypted, compressed map data that the device was shipped with (or was otherwise supplied from the map vendor, such as Tele Atlas). The present invention is then implemented as follows: the user enters a map correction as and when needed, using a touch screen interaction, touching large graphical icons, as exemplified by FIGS. 1A and 1B, into display 21. The UI module 22 captures the map fix and sends it to a map fix store 26. As soon as the map fix is in the map fix 26 store, it is made available to the route planning module 23 and the UI module 22. If the map fix requires re-planning of even the current route being driven, then that will happen automatically (if the user configures that option). For example, the device might plan a route that requires the user to turn into a street: when the turning is approached, the user finds that it has recently been made a 'no entry' street. The user can enter an appropriate map correction: a new route, taking into account the no entry street, is then immediately planned and appropriate route guidance given. Likewise, if the user plans a completely new route to another destination, the new route will also take the map fix into account. If the map fix should affect how the map should appear (for example, re-naming a road, showing a new POI, such as a speed camera), then that new appearance will be immediately present. Automatic use of the correction is not mandatory though; some users may prefer for route calculation etc. to exclude map corrections.

Appendix 1 describes a typical device that can implement the present invention. Appendix 2 are the high level requirements for Map Share.

Appendix 1

The present invention can be implemented in an integrated navigation device from TomTom B.V. called GO. GO deploys navigation software called Navigator (or Navcore) and has an internal GPS receiver. Navigator software can also run on a touch screen (i.e. stylus controlled) Pocket PC powered PDA device, such as the Compaq iPaq. It then provides a GPS based navigation system when the PDA is coupled with a GPS receiver. The combined PDA and GPS receiver system is designed to be used as an in-vehicle navigation system.

The invention may also be implemented in any other arrangement of navigation device, such as one with an integral GPS receiver/computer/display, or a device designed for non-vehicle use (e.g. for walkers) or vehicles other than cars (e.g. aircraft). The navigation device may implement any kid of position sensing technology and is not limited to GPS; it can hence be implemented using other kinds of GNSS (global navigation satellite system) such as the European Galileo system. Equally, it is not limited to satellite based location/velocity systems but can be deployed using ground-based beacons or any other kind of system that enables the device to determine its geographic location.

Figure 3:
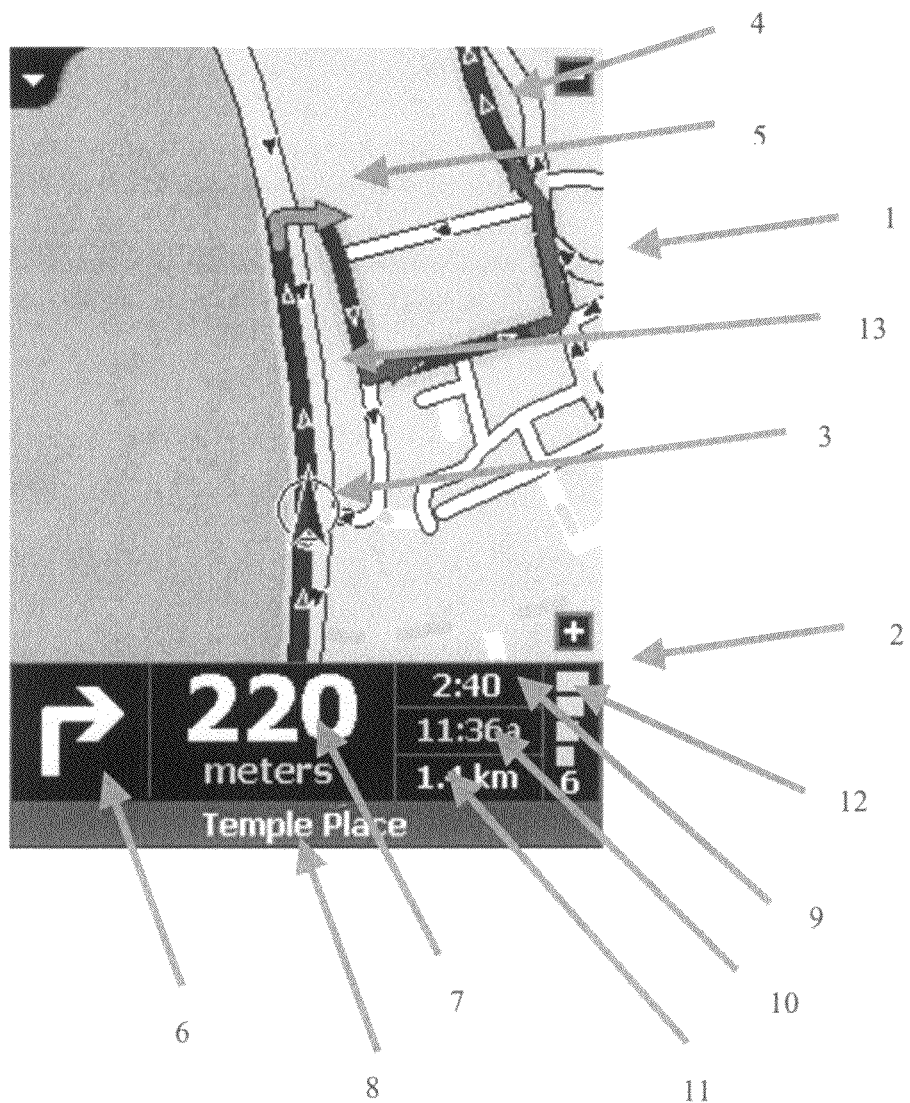
FIG. 3 is a screen shot from a navigation device implementing the present invention; the screen shot shows a plan map view and a status bar running along the bottom of the display.
Figure 4:
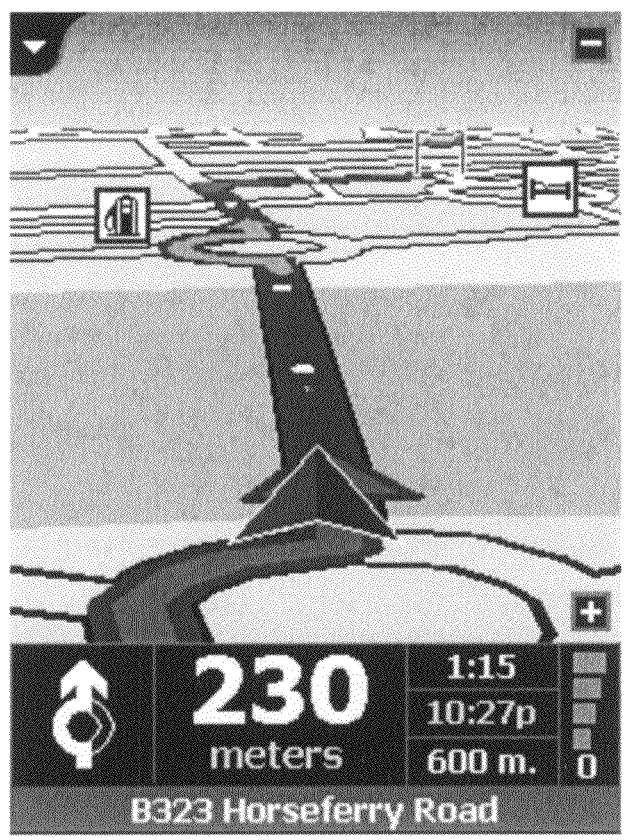
FIG. 4 is a screen shot from the navigation device implementing a 3-D view.

Navigator software, when running on a PDA, results in a navigation device that causes the normal navigation mode screen shown in FIG. 3 to be displayed. This view provides driving instructions using a combination of text, symbols, voice guidance and a moving map. Key user interface elements are the following: a 2-D map 1 occupies most of the screen. The map shows the user's car and its immediate surroundings, rotated in such a way that the direction in which the car is moving is always "up". Running across the bottom quarter of the screen is the status bar 2. The current location of the device, as the device itself determines using conventional GPS location finding and its orientation (as inferred from its direction of travel) is depicted by an arrow 3. The route calculated by the device (using route calculation algorithms stored in device memory as applied to map data stored in a map database in device memory) is shown as darkened path 4 superimposed with arrows giving the travel direction. On the darkened path 4, all major actions (e.g. turning corners, crossroads, roundabouts etc.) are schematically depicted by arrows 5 overlaying the path 4. The status bar 2 also includes at its left hand side a schematic 6 depicting the next action (here, a right turn). The status bar 2 also shows the distance to the next action (i.e. the right turn—here the distance is 220 meters) as extracted from a database of the entire route calculated by the device (i.e. a list of all roads and related actions defining the route to be taken). Status bar 2 also shows the name of the current road 8, the estimated time before arrival 9 (here 2 minutes and 40 seconds), the actual estimated arrival time 10 (11.36 am) and the distance to the destination 11 (1.4 Km). The GPS signal strength is shown in a mobile-phone style signal strength indicator 12. A 3-D map view is also possible, as shown in FIG. 4.

If the user touches the screen 13, then a navigation screen main menu (not shown) is displayed; from this menu, other core navigation functions within the Navigator application can be initiated or controlled. Allowing core navigation functions to be selected from a menu screen that is itself very readily called up (e.g. one step away from the map display to the menu screen) greatly simplifies the user interaction and makes it faster and easier.

Figure 5:
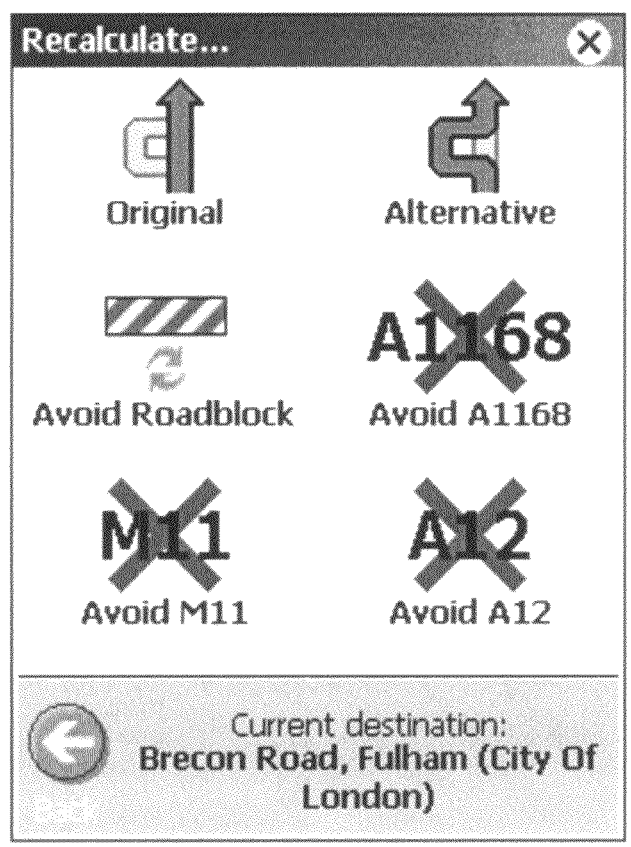
FIG. 5 is a screen shot from the navigation device showing a navigation menu.

The area of the touch zone which needs to be touched by a user is far larger than in most stylus based touch screen systems. It is designed to be large enough to be reliably selected by a single finger without special accuracy; i.e. to mimic the real-life conditions for a driver when controlling a vehicle; he or she will have little time to look at a highly detailed screen with small control icons, and still less time to accurately press one of those small control icons. Hence, using a very large touch screen area associated with a given soft key (or hidden soft key, as in the centre of the screen 13) is a deliberate design feature of this implementation. Unlike other stylus based applications, this design feature is consistently deployed throughout Navigator to select core functions that are likely to be needed by a driver whilst actually driving. Hence, whenever the user is given the choice of selecting on-screen icons (e.g. control icons, or keys of a virtual keyboard to enter a destination address, for example), then the design of those icons/keys is kept simple and the associated touch screen zones is expanded to such a size that each icon/key can unambiguously be finger selected. In practice, the associated touch screen zone will be of the order of at least 0.7 $cm^2$ and will typically be a square zone. In normal navigation mode, the device displays a map. Touching the map (i.e. the touch sensitive display once (or twice in a different implementation) near to the screen centre (or any part of the screen in another implementation) will then call up either directly (i.e. the next level down) or indirectly (i.e. two or more levels down) a navigation menu (see FIG. 5) with large icons corresponding to various navigation functions, such as the option to calculate an alternative route, and re-calculate the route so as to avoid the next section of road (useful when faced with an obstruction or heavy congestion); or recalculate the route so as to avoid specific, listed roads.

The actual physical structure of the device is fundamentally different from a conventional embedded device in terms of the memory architecture (see system Architecture section below). At a high level it is similar though: memory stores the route calculation algorithms, map database and user interface software; a microprocessor interprets and processes user input (e.g. using a device touch screen to input the start and destination addresses and all other control inputs) and deploys the route calculation algorithms to calculate the optimal route. 'Optimal' may refer to criteria such as shortest time or shortest distance, or some other user-related factors.

More specifically, the user inputs his start position and required destination in the normal manner into the Navigator software runng on the PDA using a virtual keyboard. The user then selects the manner in which a travel route is calculated: various modes are offered, such as a 'fast' mode that calculates the route very rapidly, but the route might not be the shortest; a 'full' mode that looks at all possible routes and locates the shortest, but takes longer to calculate etc. Other options are possible, with a user defining a route that is scenic—e.g. passes the most POI (points of interest) marked as views of outstanding beauty, or passes the most POIs of possible interest to children or uses the fewest junctions etc.

Roads themselves are described in the map database that is part of Navigator (or is otherwise accessed by it) running on the PDA as lines—i.e. vectors (e.g. start point, end point, direction for a road, with an entire road being made up of many hundreds of such sections, each uniquely defined by start point/end point direction parameters). A map is then a set of such road vectors, plus points of interest (POIs), plus road names, plus other geographic features like park boundaries, river boundaries etc, all of which are defined in terms of vectors. All map features (e.g. road vectors, POIs etc.) are defined in a co-ordinate system that corresponds or relates to the GPS co-ordinate system, enabling a device's position as determined through a GPS system to be located onto the relevant road shown in a map.

Route calculation uses complex algorithms that are part of the Navigator software. The algorithms are applied to score large numbers of potential different routes. The Navigator software then evaluates them against the user defined criteria (or device defaults), such as a full mode scan, with scenic route, past museums, and no speed camera. The route which best meets the defined criteria is then calculated by a processor in the PDA and then stored in a database in RAM as a sequence of vectors, road names and actions to be done at vector end-points (e.g. corresponding to pre-determined distances along each road of the route, such as after 100 meters, turn left into street x).

Figure 6A:
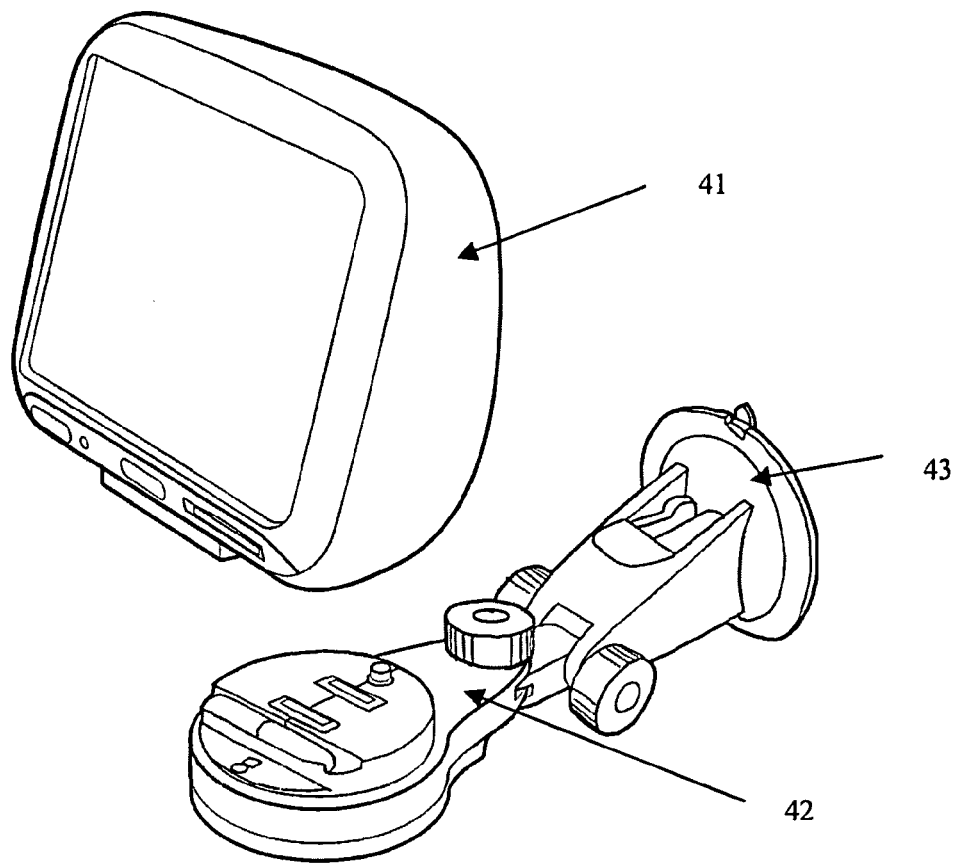
FIGS. 6A and 6B are perspective views of the navigation device.
Figure 6B:
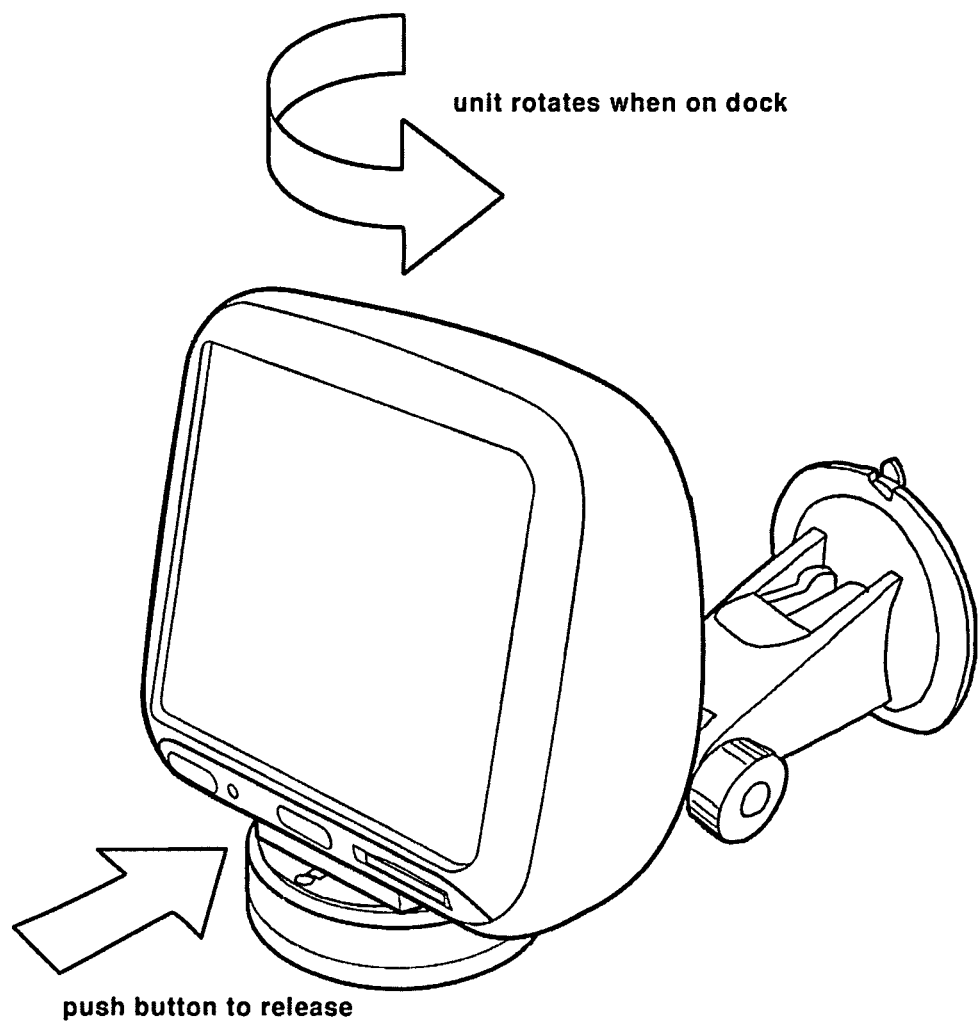

FIGS. 6A and 6B are perspective views of an actual implementation of a navigation device. The navigation device is a unit that includes display, internal GPS receiver, microprocessor, power supply and memory systems. The device sites on an arm, which itself is secured to the car dashboard using a large suction cup.

System Architecture

Figure 7:
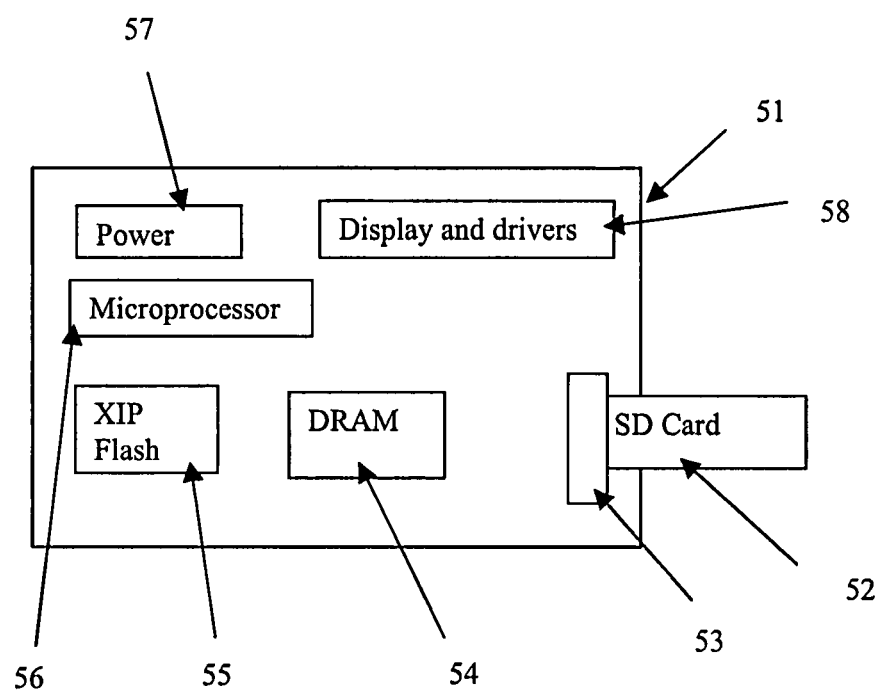
FIG. 7 is a schematic view of the system architecture for the navigation device.

In contrast to conventional embedded devices which execute all the OS and application code in place from a large mask ROM or Flash device, an implementation of the present invention uses a new memory architecture. FIG. 7 schematically depicts the device. The device, indicated generally at 51, includes conventional items such as a microprocessor 56, power source 57, display and related rivers 58. In addition, it includes a SD card reader 53; a SD card 52 is shown slotted into position. The device 51 has internal DRAM 54 and XIP Flash 55 and.

The device hence uses three different forms of memory:
1. A small amount of internal XIP (eXecute In Place) Flash ROM 55. This is analogous to the PCs BIOS ROM and will only contain a proprietary boot loader, $E^2$ emulation (for UID and manufacturing data) and splash screen bit maps. This is estimated to be 256 KB in size and would be on a slow 8 bit wide SRAM interface.
2. The main system RAM (or DRAM) memory 54, this is analogous to the PCs main memory (RAM). This will be where all the main code executes from as well as providing the video RAM and workspace for the OS and applications. Note: No persistent user data will be stored in the main system RAM (like a PC) i.e. there will be no "Ram drive". This RAM will be exclusively connected to a 32 bit 100 MHz synchronous high-speed bus.
3. Non-volatile storage, analogous to the PCs hard disk. This is implemented as removable NAND flash based SD cards 52. These devices do not support XIP. All the OS, application, settings files and map data will be permanently stored on SD cards On boot up the proprietary boot loader 55 will prompt for the user to insert the supplied SD card 52. When this is done, the device will copy a special system file from the SD card 52 into RAM 54. This file will contain the Operating System and navigation application. Once this is complete control will be passed to the application. The application then starts and access non-volatile data e.g. maps from the SD card 52.

When the device is subsequently switched off, the RAM 54 contents is preserved so this boot up procedure only occurs the first time the device is used.

GO Product Specification

Introduction

GO is a stand-alone fully integrated personal navigation device. It will operate independently from any connection to the vehicle.

Target Markets

GO is intended to address the general personal navigation market. In particular it is designed to extend the market for personal navigation beyond the "early adopter" market. As such it is a complete stand-alone solution; it does not require access to a PC, PDA or Internet connection. The emphasis will be on completeness and ease of use.

Although GO is a complete personal navigation solution it is primarily intended for in vehicle use. The primary target market is anybody who drives a vehicle either for business or pleasure.

To successfully address this market GO must satisfy the following top-level requirements:
1. Acceptable price point—Appropriate compromise between product features and cost.
2. Simplicity—Installation and operation of GO will be simple and intuitive, all major functions should be accomplished by an average non PG-literate user without recourse to the product manual.
3. Flexibility—All map data and operating programs will be supplied on plug in memory cards. The device can easily be extended to cover different locals.
4. Reliability—Although in-car navigation systems are not considered safety critical components users will come to rely on GO. It will be engineered to all relevant automotive environmental standards. In addition it will be tolerant to short GPS coverage outages.

Channels

Consumer electronics retail outlets

Automotive accessory outlets

Specialist car accessory fitting garages

Product Summary

GO is an in-vehicle personal navigation device. It is designed as an appliance, that is, for a specific function rather than a general purpose one. It is designed for the consumer after-sales automotive market. It will be simple to use and install by the end user, although a professional fitting kit will be optionally supplied.

The principal features are:

Built on standard commodity PocketPC 2002 components

Standard PocketPC 3.5" ¼ VGA transflective TFT LCD display mounted in landscape orientation ROM less soft-boot memory architecture Highly integrated ARM9 200 MHz CPU SD card memory slot for application and map data storage Integrated GPS receiver and antenna Integrated two axis accelerometer for simple dead reckoning Power, audio, debug and external GPS antenna connections made through docking connector on base of unit Embedded Linux OS with no GUI layer, application provides its own UI Very simple touch screen UI optimised for finger use High quality integrated speaker for voice instructions Internal rechargeable Li-Ion battery giving at least five hours of continuous operation Operating System GO will use a customised version of embedded Linux. This will be loaded from an SD card by a custom boot-loader program which resides in Flash memory Hard Buttons GO will have only one hard button, the power button. It is pressed once to turn on or off GO. The UI will be designed so that all other operations are easily accessible through the pen based UI.

There will also be a concealed hard reset button.

Architecture

GO architecture is based around a highly integrated single chip processor designed for mobile computing devices. This device delivers approximately 200 MIPs of performance from an industry standard ARM920T processor. It also contains all the peripherals required excluding the GPS baseband. These peripherals include DRAM controller, timer/counters, UART's, SD interface and LCD controller.

Figure 8:
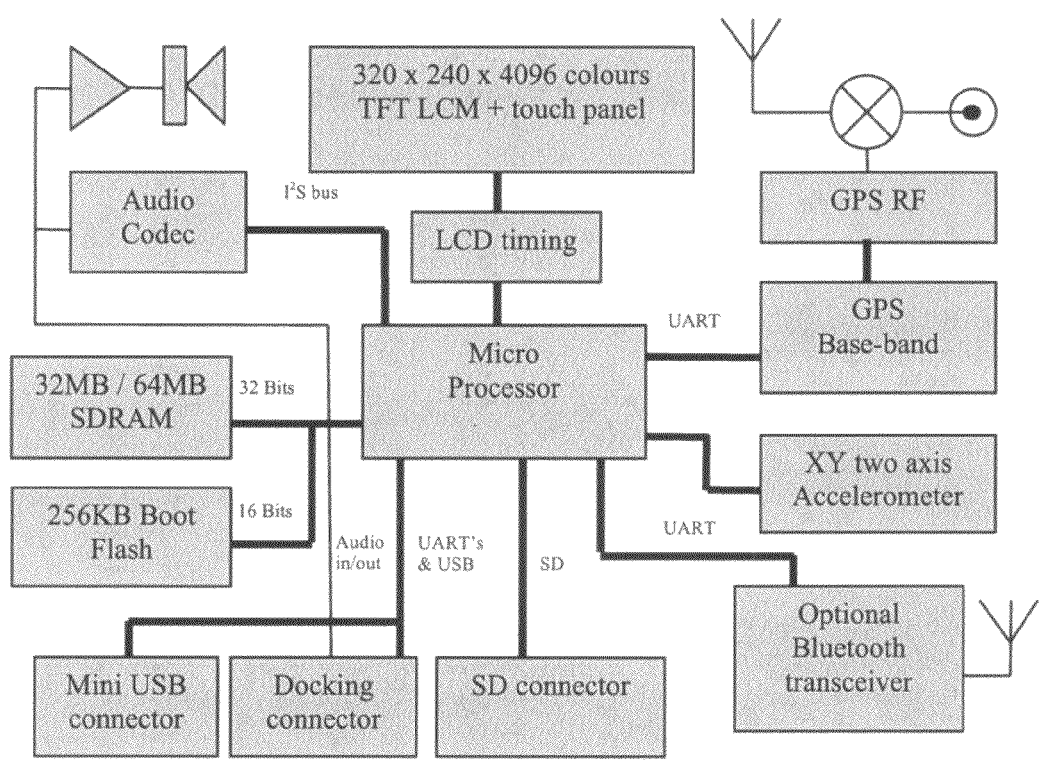
FIG. 8 is a block diagram of components in the navigation device.

The main elements of this architecture are:
Microprocessor running at 200 MHz
32 MB or 64 MB of fast synchronous DRAM (SDRAM) with low power self refresh. Arranged as two devices on a 32 bit wide 100 MHz bus
SD card interface for all non-volatile storage including the OS (No RAM drive)
Native (bare metal) boot loader stored in 256 KB of NOR Flash. This Flash device will contain a boot sector which is write protected to store protected data such as unique product ID's and manufacturing data.
Debug UART (RS232 3V levels) connected to the docking connector
USB client for PC connectivity
Integrated GPS receiver
Integrated two axis accelerometer
Optional integrated Bluetooth transceiver for PDA and mobile phone connectivity
High quality audio through $I^2S$ codec and amplifier
FIG. 8 is the GO block diagram

Power Management

GO will be powered from an integrated Li-Ion 2200 mAH rechargeable battery. This battery can be charged, and the device powered (even if the battery contains no charge) from an externally supplied +5V power source. This external +5V power source is supplied via the docking connector or a DC jack socket.

This +5V supply will be generated from the vehicle's main supply rail or from a mains adapter externally. The device will be turned on and off by a single button. When the device is turned off the DRAM contents will be preserved by placing the RAM in self-refresh so that when switched on GO will resume from where it was switched off. There will also be a wake-up signal available through the docking connector, this can be used to auto-switch on GO when the vehicle ignition is switched on.

There will also be a small hidden reset switch.

System Memory Architecture

In contrast to conventional embedded devices which execute all the OS and application code in place from a large mask ROM or Flash device, GO will be based on a new memory architecture which is much closer to a PC This will be made up of three forms of memory:
4. A small amount of XIP (eXecute In Place) Flash RO. This is analogous to the PCs BIOS ROM and will only contain a proprietary boot loader, $E^2$ emulation (for UID and manufacturing data) and splash screen bit maps. This is estimated to be 256 KB in size and would be on a slow 8 bit wide SRAM interface.
5. The main system memory, this is analogous to the PCs main memory (RA. This will be where all the main code executes from as well as providing the video RAM and workspace for the OS and applications. Note: No persistent user data will be stored in the main system RAM (like a PC) i.e. there will be no "Ram drive". This RAM will be exclusively connected to a 32 bit 100% synchronous high-speed bus. GO will contain two sites for 16 bit wide 256/512 Mbit SDRAM's allowing memory configurations of 32 MB (16 bit wide) 64 MB 32 bit wide and 128 MB (32 bit wide).
6. Non-volatile storage, analogous to the PCs hard disk. This is implemented as removable NAND flash based SD cards. These devices do not support XIP. All the OS, application, settings files and map data will be permanently stored on SD cards

Audio

A 52 mm diameter speaker is housed in GO to give good quality spoken instructions. This will be driven by an internal amplifier and audio codec. Audio line out will also be present on the docking connector.

SD Memory Slot

GO will contain one standard SD card socket. These are used to load system software and to access map data.

Display

GO will use a transflective 3.5" TFT backlit display It will be a 'standard' ¼ VGA display as used by PocketPC PDA's. It will also contain a touch panel and bright CCFL backlight.

Power Supplies

Power Supply—AC Adapter Socket
4.75V to 5.25V (5.00V+/−5%) @ 2A
Power Supply—Docking Connector
4.75V to 5.25V (5.00V+/−5%) @ 2A

Variants

It shall be possible to assemble and test the following variants of GO:
Standard (Bluetooth Depopulated, 32 Mbyte RAM)
In the Standard variant the Bluetooth function is not populated, and 32 Mbytes RAM is fitted.
Bluetooth Option (Future Variant)
The product design should include Bluetooth although it is not populated in the standard variant to minimise BOM cost. The design should ensure that all other functions (including GPS RF performance) operate without degradation when the Bluetooth function is operating.
64 Mbyte RAM Option (Future Variant)
The product design should ensure it is possible to fit 64 Mbyte RAM instead of 32 Mbyte.

Subassemblies

Figure 9:
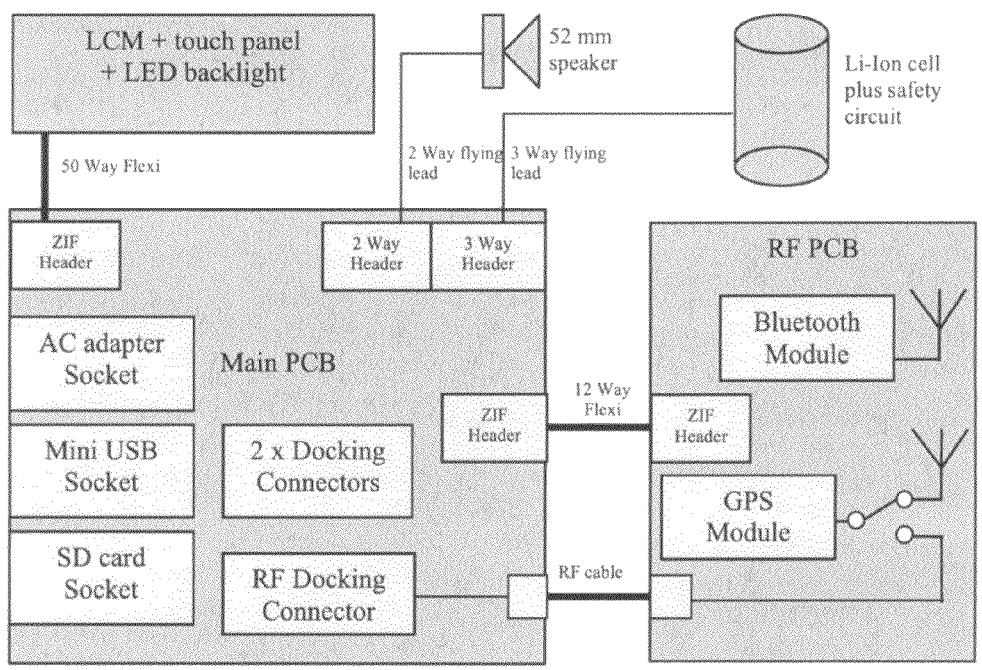
FIG. 9 is a diagram of the electrical subassemblies in the FIG. 8 navigation device.

GO consists of the following electrical subassemblies, shown in FIG. 9.

RF Cable

The RF cable feeds the RF signal from an external GPS antenna (which connects to GO via the RF docking connector) to the RF PCB where the GPS module is situated. External connectors

Docking Connectors

Two Docking Connectors provide an interface to external Docking Stations.

Docking Connector #1 pin Pinout

| Pin | Signal | Dir | Type | Description |
|---|---|---|---|---|
| 1 | GND | — | — | Signal and power GND |
| 2 | GND | — | — | |

-continued

| Pin | Signal | Dir | Type | Description |
|---|---|---|---|---|
| 3 | DOCKSNS1 | I/P | PU | Docking Station Sense [0, 1] - These signals are |
| 4 | DOCKSNS0 | I/P | PU | connected to pull-up resistors within the unit. The Docking Station pulls either or both of these signals to GND to indicate the presence and type of Docking Station. |
| 5 | AUDIOL | O/P | | Audio line outputs (Left and Right) to connect to car |
| 6 | AUDIOR | O/P | | audio system. |
| 7 | MUTE | O/P | O/D | The unit pulls this line to GND to signal the car audio system to mute itself while the unit is issuing a voice command. |
| 8 | IGNITION | I/P | PD | Ignition sense. |
| 9 | DOCKPWR | I/P | PWR | +5 V power from the Docking Station to |
| 10 | DOCKPWR | I/P | PWR | simultaneously power the unit and charge the battery. |

PWR Power connection
O/D Open-Drain output
PU Pull-Up resistor within the unit
PD Pull-Down resistor within the unit Docking Connector #2 Pinout

| Pin | Signal | Dir | Type | Description |
|---|---|---|---|---|
| 1 | TXD | O/P | UART | 3 V logic level UART signals |
| 2 | RXD | I/P | UART | |
| 3 | RTS | O/P | UART | |
| 4 | CTS | I/P | UART | |
| 5 | GND | — | PWR | |
| 6 | nTRST | I/P | JTAG | CPU JTAG signals for test and configuration |
| 7 | TMS | I/P | JTAG | |
| 8 | TCK | I/P | JTAG | |
| 9 | TDI | I/P | JTAG | |
| 10 | TDO | O/P | JTAG | |

RF Docking Connector
The RF Docking Connector allows connection of an external active GPS antenna via a Docking Station.
AC Adapter Socket
The AC adapter socket allows power to be supplied from a low cost AC adapter or CLA (Cigarette Lighter Adapter).
USB Connector
The USB connector allows connection to a PC by means of a standard mini USB cable.
SD Card Socket
A hard locking SD card socket suitable for high vibration applications supports SDIO, SD memory and MMC cards.
(Although GO provides hardware support for SDIO, software support will not be available at the time of product introduction)
Processor
The processor is the ARM920T based SOC (System on chip) operating at approx 200 Mhz.
RAM
GO will be fitted with RAM to the following specification:

| Type | SDRAM with low-power refresh ("mobile" SDRAM) |
|---|---|
| Total memory | 32 Mbyte (standard) or 64 Mbyte (future option) |
| Bus width | 32-bit |
| Minimum speed | 100 Mhz |
| Maximum self refresh current | 500 µA per device |
| Configuration | 2 × 16-bit wide CSP sites |

Flash Memory
GO will be fitted with a minimum of 256 kbyte of 16-bit wide Flash Memory to contain the following:

Boot loader code to enable loading of O/S from SD card
Factory set read-only protected manufacturing parameters (e.g. manufactured date) and unique ID (E2PROM emulation)
User specific settings (E2PROM emulation)
The following devices can be used depending on price and availability:
GPS Internal Antenna
The GPS internal antenna is attached directly to the RF PCB.
GPS External (Active) Antenna Switching
When an external antenna is connected via the RF Docking Connector, the GPS antenna source is automatically switched to the external antenna.
Accelerometer
A solid state accelerometer is connected directly to the processor to provide information about change of speed and direction.
Auxiliary Functions
Ignition Synchronization
Ignition Wakeup
A rising edge on the Docking Station IGNITION signal will wakeup the unit. The IGNITION signal may be connected to a 12V or 24V vehicle battery.
Ignition State Monitoring
The state of the Docking Station IGNITION signal is detected and fed to a GPIO pin to allow software to turn off the unit when the ignition signal goes low.
Standard Peripherals
The following peripherals will be included as standard with GO.
Simple docking shoe. Mounts GO and allows charging through a DC jack. No other connectivity is included in the simple dock.
Cigarette lighter power cable connecting to GO through the DC jack socket or simple docking shoe.
Mini USB cable for PC connectivity
Universal mains adapter for connection to DC Jack socket
Optional Peripherals
The following optional peripherals will be available at or after the time of launch of GO
Active antenna kit. Contains a GPS active antenna and a docking shoe with GPS RF connector and cable fitted. For self installation when an external antenna is required.
Professional vehicle docking kit. For fitting by professional installation only. Allows direct connection to vehicle supply, audio system and active antenna via a vehicle interface box.

Appendix 2
Map Share High Level Requirements (0.40)
Introduction

TomTom strives to offer the most accurate map data available to its customers. Currently, map updates are made by TomTom map suppliers, and TomTom is able to feed back errors in some maps via a reporting tool to Tele Atlas. This situation is far from ideal as it may take several map revisions before a map error is fixed, and all fixes made as a result of TomTom error reports are also shared with competitors. In order for TomTom to offer map updates in a timelier manner, a new system of map error reporting and correction is required. These improvements will be delivered through the Map Share project.

1.1 Scope

This document describes high level requirements of the Map Share project.

2 High Level Requirements

This section describes the high level requirements of Map Share.

2.1 User Requirements

This section describes the user requirements for Map Share.

2.1.1 Map Corrections

Some map errors can be corrected immediately by the user. This section describes the user requirements relating to map corrections.

2.1.1.1 On-Device Map Corrections

The user shall be able to make map corrections on their NavCore device.

2.1.1.2 TomTom Home Map Corrections

The user shall be able to make map corrections within the Navigator control of the TomTom Home application.

2.1.2 Map Correction Types

This section describes the user requirements relating to the types of map correction that can be made.

2.1.2.1 Add Safety Camera

The user shall be able to add the locations of safety cameras on the map.

Note: it is already possible to report safety cameras in this way, however, the implementation must be adjusted to simplify the process of reporting, make it consistent with other map corrections and allow users to see the safety cameras that they have reported immediately.

2.1.2.2 Block Roads

The user shall be able to block roads on the map.

2.1.2.3 Un-Block Roads

The user shall be able to un-block roads on the map.

2.1.2.4 Modify Traffic Direction

The user shall be able to modify the traffic direction properties of roads on the map. Specifically the user shall be able to:

Change a two-way road into a one-way road (in either direction)
Change a one-way road to a two-way road
Change the direction of a one-way road to the other direction.

2.1.2.5 Add Road

The user shall be able to add a road (consisting of one or more nodes) on the map.

2.1.2.6 Connect Roads

The user shall be able to connect 2 points on the map and define this new link as a new road.

2.1.2.7 Add Street Names

The user shall be able to add street names to un-named roads on the map.

2.1.2.8 Modify Street Names

The user shall be able to modify the names of roads on the map.

2.1.2.9 Modify Speed Limits

The user shall be able to modify the maximum speed of roads on the map.

2.1.3 Availability of On-Device Corrections

Once map corrections are present on the NavCore device, they must be made available to the user. This section describes the user requirements relating to the availability of on-device corrections.

2.1.3.1 Availability of Private Corrections

The user shall be able to use private corrections as soon as they are recorded.

2.1.3.2 Availability of Public Corrections

The user shall be able to use public corrections as soon as they have been downloaded to the device.

2.1.4 Using Map Corrections

As some map corrections may have been made by other TomTom owners, the user must be able to select which corrections to use when calculating routes. This section describes the user requirements relating to the use of map corrections on the user's device.

2.1.4.1 Safety Camera Warnings

The user shall be able to choose whether to receive warnings for private and/or public reported safety cameras.

2.1.4.2 Use of Private Map Corrections

The user shall be able to use or ignore their Private map corrections whenever they plan a route that includes a correction.

2.1.4.3 Use of Public Map Corrections

The user shall be able to use or ignore their Public map corrections whenever they plan a route that includes a correction.

2.1.4.4 Automatic Map Correction Use

The user shall be able to configure their device such that private and/or public corrections from one or more categories are automatically included within route calculations. The user shall be informed that they are using corrections.

2.1.4.5 Route Recalculation

The user shall be able to recalculate routes to include or exclude map corrections.

2.1.4.6 Map Correction Removal

The user shall be able to remove a map correction from their device.

2.1.5 Map Error Reporting

Some map errors are too complicated or large in scale to make corrections on the device itself. These errors need to be reported to TomTom, so that we (or our map suppliers) can take corrective action. This section describes the user requirements relating to map error reporting.

2.1.5.1 On-Device Map Error Reporting

The user shall be able to create map error reports on their device and upload these to the TomTom PLUS server.

Note: the user shall NOT be able to create map error reports while driving.

Note: it would be acceptable to offer users a list of pre-defined error types when creating error reports on the device.

2.1.5.2 TomTom Home Map Error Reporting

The user shall be able to create map error reports within the Navigator control of the TomTom Home and upload these to the TomTom PLUS server.

Note: the user should NOT have to register as a TomTom customer in order to create a map error report.

2.1.5.3 Importing On-Device Error Reports in TomTom Home

The user shall be able to import map error reports captured on their device to the TomTom Home application. The user shall be able to edit these reports and then upload them to the TomTom PLUS server.

2.1.5.4 Map Error Report Feedback

The user shall be given feedback regarding their map error reports.

2.1.6 Automatic Map Error Identification

In some circumstances it is possible for the TomTom device to suggest corrections to the user, based on their use of the product. This section describes the user requirements relating to automatic identification of map errors.

2.1.6.1 Automatic Road Block Suggestion

The user shall be prompted to block roads that they chose to avoid within route plans on multiple occasions.

2.1.6.2 Automatic Road Creation Suggestion

The user shall be prompted to add a road on the map if they drive through a map area that is not marked as a road on multiple occasions.

2.1.6.3 Automatic Name Road Suggestion

The user shall be prompted to add a name to unnamed roads on the map if they plan routes to such a road on multiple occasions.

2.1.6.4 Automatic Modify Speed Limit Suggestion

The user shall be prompted to modify the speed limit of a road if they drive along it at a significantly different speed from that stated in the map data on multiple occasions.

2.1.7 Map Correction Sharing

Users of Map Share may wish to share their corrections with other TomTom owners. This section describes the user requirements relating to the user's ability to share map corrections with other TomTom owners.

2.1.7.1 Private Map Corrections

The user shall be able to create corrections for their personal use only. These corrections shall NOT be sent to the TomTom PLUS server.

2.1.7.2 Public Map Corrections

The user shall be able to create corrections that are shared with other TomTom owners. These corrections shall be uploaded to the TomTom PLUS server and made available to other Map Share users.

2.1.7.3 Public Map Correction Community Categorisation

The user shall be able to categorise their public map corrections according to the user community for which it is applicable. The following community categories shall be made available:

All users
All motorists
Heavy goods vehicle drivers
Motorcyclists
Limited speed vehicle drivers
Pedestrians
Bicycles

2.1.7.4 Trusted User Status

The user shall be able to acquire "trusted user" status, based upon the number and quality of map corrections that they upload.

2.1.7.5 Map Fix Information

The user shall be informed if they attempt to report a map correction that has been corrected in a newer version of the map data that they are using. The user shall also be informed how they can purchase the updated map.

2.1.8 Map Correction Retrieval

In order to use public map corrections the user must retrieve them from the TomTom PLUS server. This section describes the user requirements relating to map correction retrieval.

2.1.8.1 Public Map Correction Retrieval

The user shall be able to download public map corrections from the TomTom PLUS server to their device, and to the TomTom Home application.

2.1.8.2 Public Map Correction Community Category Retrieval

The user shall be able to download public map corrections from one or more community categories.

Note: Public correction community categories are defined in section 2.1.7.3.

2.1.8.3 Public Map Correction Source Category Retrieval

The user shall be able to download public map corrections from one or more community source categories.

Note: Public correction source categories are defined in section 2.2.1.5.

2.1.8.4 Public Map Correction Supplier Category Retrieval

The user shall be able to download public map corrections from one or more map supplier source categories. A supplier category shall be provided for each TomTom map supplier.

2.1.8.5 Public Map Correction Location Category Retrieval

The user shall be able to download public map corrections from one or more location categories.

Note: The following categories shall be available:
All maps
All maps on device
Currently loaded map on device

2.2 Technical Constraints

Some features within Map Share must be implemented in a specific way in order to address the user's requirements and protect TomTom's interests. This section describes all known technical constraints placed upon the V1 scope of Map Share.

2.2.1 Public Map Correction Management

In order to allow users to make informed decisions relating to public map corrections, Map Share must manage these corrections. This section describes the constraints relating to map correction categorisation.

2.2.1.1 Map Correction Aggregation

TomTom shall aggregate all public map corrections sent to the TomTom PLUS server.

2.2.1.2 Map Correction Analysis

Public map corrections shall be analysed in order to assess their source, applicability and trustworthiness.

2.2.1.3 Map Correction Distribution

TomTom shall distribute all public map corrections to Map Share users upon request.

2.2.1.4 Map Correction Removal

TomTom shall assess the applicability of each map correction with respect to each map supplied to users. If a map correction is found not to be applicable for a given map then it shall be removed from the aggregated map corrections and NOT distributed to users of this map.

2.2.1.5 Map Connection Source Categories

Map corrections held on the TomTom PLUS server shall be categorised by source so that the user can be informed of the relative trustworthiness of the correction's source.

2.2.1.5.1 TomTom Endorsement

TomTom shall be able to endorse specific map corrections and these shall be represented to the user in a specific category.

2.2.1.5.2 Multiple User Reports

Map corrections that have been reported by a single user shall be represented to other users in a specific category.

2.2.1.5.3 Multiple User Reports

Map corrections that have been reported by more than one user shall be represented to other users in specific categories. Specifically, the following categories shall be represented:

2-5 user reports
More than 5 user reports

2.2.1.5.4 Trusted User Reports

Map corrections that have been reported by trusted users shall be represented to other users in a specific category.

2.2.1.5.5 Community Endorsement

Map Share users shall be able to endorse map corrections made by other TomTom owners and evidence of these endorsements shall be represented to the user.

2.2.2 Data Format

In order to gain (and maintain) a competitive advantage from Map Share, it is imperative that map correction data is held in a structured, re-usable and secure way. This section describes the constraints relating to security.

2.2.2.1 Unique Identification

Each map correction shall be uniquely identified.

2.2.2.2 Time Stamp

Each map correction captured on the device shall be time stamped with the time at which it was input and/or reported.

2.2.2.3 Modularity

Each map correction shall be stored in a form that allows it to be applied to the map independently of all other map corrections (i.e. NavCore shall be able to decide on a per-correction basis whether the correction should be applied to the map and represented to the user).

2.2.2.4 Non-Permanent Modification

Map corrections shall NOT make a permanent modification to the user's map data.

2.2.2.5 Data Compression

Map corrections shall be highly compressible to allow fast and cheap distribution over wireless networks.

2.2.2.6 Data Encryption

Map corrections shall be highly encrypted such that it is not possible for the data format to be reverse engineered.

2.2.2.7 Data Integrity

Map corrections shall be stored in such a way that they are retained though a map upgrade process.

2.2.2.8 Future Map Version Compatibility

Map corrections shall be compatible with future map versions, such that corrections made on older versions of a map can be applied to the latest version.

2.2.2.9 Previous Map Version Incompatibility

Map corrections shall NOT be compatible with previous map versions. It shall NOT be possible to apply a map correction made on the current map version with a previous map version.

2.2.2.10 Map Supplier Independence

Map corrections shall be independent of map suppler, such that map corrections can be applied to maps from different suppliers.

2.2.2.11 Tele Atlas API Compatibility

Map corrections shall be stored in a format that is compatible with the Tele Atlas map reporting API such that TomTom is capable of sending correctly formatted reports to Tele Atlas if it wishes to do so.

2.2.3 On-Device Map Correction Handling

In order to ensure that map corrections are correctly handled on the user's device, certain rules must be applied. This section describes the constraints relating to on-device map correction handling.

2.2.3.1 Automatic Map Correction Omission

Map corrections created on previous map versions shall be checked to see if they are applicable to the currently loaded map on the user's device. Map corrections that are not applicable shall NOT be used within route calculations.

2.2.4 Map Error Report Management

In order to manage map error reports in a more effective manner, TomTom must implement method for aggregating and prioritising error reports. This section describes the constraints relating to map error report management.

2.2.4.1 Map Error Report Format

All map error reports shall be created in a format that is compatible with the Tele Atlas map error reporting API.

2.2.4.2 Map Error Report Aggregation

TomTom shall aggregate all map error reports from user devices, TomTom Home and the TomTom website.

2.2.4.3 Map Error Report Prioritisation

TomTom shall assess all map error reports and assign priorities to these, such that the most serious errors are clearly highlighted. These priorities shall be communicated to TomTom map suppliers when submitting error reports to them.

2.2.4.4 Tele Atlas API Compatibility

Map error reports shall be stored in a format that is compatible with the Tele Atlas map reporting API such that TomTom is capable of sending correctly formatted reports to Tele Atlas if it wishes to do so.

3 Omissions

This section describes the high level requirements that have been omitted from the V1 scope of Map Share.

3.1 User Requirements

This section describes the omitted user requirements for Map Share.

3.1.1 Map Correction Types

This section describes the map correction types that have been omitted from the V1 scope of Map Share.

3.1.1.1 Modify City/Place Names

The user shall be able to modify the names of cities (and other places) on the map.

3.1.1.2 Block Roads for Transportation Types

The user shall be able to block access to a road for one or more transportation types. Specifically the user shall be able to block access for the following transportation types:

All motor vehicles
Pedestrians
Heavy Goods Vehicles
Bicycles

3.1.1.3 Un-block Roads for Transportation Types

The user shall be able to un-block access to a road for one or more transportation types. Specifically the user shall be able to un-block access for the following transportation types:

All motor vehicles
Pedestrians
Heavy Goods Vehicles
Bicycles

3.1.1.4 Modify Road Class

The user shall be able to modify the "class" of roads on the map.

Note: road classes are used to define the properties of roads and are used within route calculation.

3.1.1.5 Add Turn Restrictions

The user shall be able to add turn restrictions to roads on the map.

3.1.1.6 Remove Turn Restrictions

The user shall be able to remove turn restrictions applied to roads on the map.

3.1.1.7 Add House Numbers

The user shall be able to add house numbers (either a single number or a range) to roads on the map.

3.1.1.8 Modify House Numbers

The user shall be able to modify the location of house numbers (either a single number or a range) applied to roads on the map.

3.1.1.9 Modify Average Speed

The user shall be able to modify the average speed of roads on the map.

3.1.1.10 Add Toll to Road

The user shall be able to mark a road on the map as a toll road.

3.1.1.11 Remove Toll from Road

The user shall be able to remove the presence of a toll from roads on the map.

3.1.1.12 Add Signposts

The user shall be able to add signpost information to roads on the map.

3.1.1.13 Modify Signposts

The user shall be able to modify the properties of signpost information associated with roads on the map.

3.1.1.14 Remove Signposts

The user shall be able to remove signpost information associated with roads on the map.

3.1.1.15 Modify POI Locations

The user shall be able to modify the location of POI on the map.

3.1.1.16 Modify POI Names

The user shall be able to modify the names of POI on the map.

3.1.1.17 Modify POI Category

The user shall be able to modify the category of POI on the map.

3.1.1.18 Remove POI

The user shall be able to remove POI from the map.

3.1.1.19 Modify Motorway Exit Numbers

The user shall be able to modify the exit numbers of motorways on the map.

3.1.1.20 Modify Post Code

The user shall be able to modify the post code associated with a road on the map.

3.1.1.21 Add Road Height Restrictions

The user shall be able to add road height restrictions to roads on the map.

3.1.1.22 Add Road Width Restrictions

The user shall be able to add road width restrictions to roads on the map.

3.1.1.23 Add Road Weight Restrictions

The user shall be able to add road weight restrictions to roads on the map.

3.1.2 Map Error Reporting

Some map errors are too complicated or large in scale to make corrections on the device itself. These errors need to be reported to TomTom, so that we (or our map suppliers) can take corrective action. This section describes the user requirements relating to map error reporting.

3.1.2.1 TomTom Website Map Error Reporting

The user shall be able to create map error reports within TomTom Support Website and upload these to the TomTom PLUS server.

- Users should not need to register as a TomTom customer in order to create a map error report
- A graphical user interface should be made available to allow easier selection of map error locations
- Feedback should be given to the user regarding the status of their report

3.2 Technical Constraints

Some features within Map Share must be implemented in a specific way in order to address the user's requirements and protect TomTom's interests. This section describes all known technical constraints that have been omitted from the V1 scope of Map Share.

3.2.1 Map Error Reporting

This section describes all known technical constraints relating to map error reporting that have been omitted from the V1 scope of Map Share.

3.2.1.1 Map Error Reporting to Tele Atlas

TomTom shall implement the Tele Atlas map error reporting API and use this as the reporting mechanism for all reports to Tele Atlas.

What is claimed is:

1. A method of organizing and distributing map correction data, comprising the steps of:
   receiving map correction data at a server from a plurality of navigation devices,
   validating said map correction data,
   categorizing said validated map correction data into at least one category based at least on a source of each received map correction,
   receiving a category selection at the server from at least one remote client device, and
   distributing categorized map correction data, based on the received category selection, to said at least one client device.

2. The method according to claim 1, wherein said step of receiving map correction data further comprises the step of receiving said map correction data over a wireless data connection.

3. The method according to claim 1, wherein said step of receiving map correction data further comprises the step of receiving said map correction data over the Internet.

4. The method according to claim 1, wherein the step of validating further comprises at least one of the steps of searching for malicious words, checking for duplicate corrections, and checking for conflicting corrections.

5. The method according to claim 1, wherein said at least one category comprises at least one of community category, correction type category, source category, location category, language category, validity category, importance category, POI category, priority category and map supplier category.

6. The method according to claim 5, wherein said source category further comprises at least one of an endorsed category, a trusted users category, a many users category, and a single user category.

7. The method according to claim 5, wherein said location category further comprises at least one of a geographic area category and a distance from location category.

8. The method according to claim 1, wherein said at least one client device is at least one of a portable information device, a mobile telephone, a navigation device, a personal computer and a personal digital assistant.

9. The method according to claim 1, wherein said step of distributing further comprises the step of distributing said categorized map correction data over at least one of a wireless data connection and a land line connection.

10. The method according to claim 1, wherein said step of distributing occurs over a portable memory device.

11. The method according to claim 1, further comprising the steps of:
   determining a map type used by said at least one client device,
   determining whether map correction data belonging to said category selection is compatible with said map type, and
   if compatible, distributing said map correction data belonging to said category selection.

12. The method according to claim 1, further comprising the step of storing said map correction data belonging to said category selection on said client device.

13. The method according to claim 12, wherein said map correction data is stored on said client device independently from map data.

14. A server apparatus for organizing and distributing map correction data, wherein the server apparatus comprises at least one memory storage, and at least one processing unit coupled to the at least memory storage, wherein the at least one processing unit is operative to:

receive map correction data from a plurality of navigation devices, validate said map correction data, categorize said validated map correction data into at least one category based at least on the source of each received map correction, receive a category selection at the server from at least one remote client device, and distribute categorized map correction data, based on the received category selection, to said at least one client device.

15. The server apparatus according to claim 14, wherein the server apparatus is further configured to receive said map correction data over a wireless data connection.

16. The server apparatus according to claim 14, wherein the server apparatus is further configured to receive said map correction data over the Internet.

17. The server apparatus according to claim 14, wherein the server apparatus is further configured to validate said map correction data by at least one of searching for malicious words, checking for duplicate corrections, and checking for conflicting corrections.

18. The server apparatus according to claim 14, wherein said at least one category comprises at least one of community category, correction type category, source category, location category, language category, validity category, importance category, POI category, priority category and map supplier category.

* * * * *